United States Patent
Kaida et al.

(10) Patent No.: US 7,371,438 B2
(45) Date of Patent: May 13, 2008

(54) POLYMERIZABLE LIQUID CRYSTAL COMPOUND, LIQUID CRYSTAL COMPOSITION AND OPTICAL ANISOTROPIC MATERIAL

(75) Inventors: Yuriko Kaida, Koriyama (JP); Hiromichi Nagayama, Koriyama (JP); Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/616,126

(22) Filed: Dec. 26, 2006

(65) Prior Publication Data

US 2007/0102669 A1    May 10, 2007

Related U.S. Application Data

(63) Continuation of application No. PCT/JP2005/001844, filed on Feb. 8, 2005.

(30) Foreign Application Priority Data

Jun. 25, 2004    (JP) .............................. 2004-187788

(51) Int. Cl.
| | | |
|---|---|---|
| C09K 19/30 | (2006.01) |
| C09K 19/20 | (2006.01) |
| C09K 19/38 | (2006.01) |
| C07C 69/76 | (2006.01) |
| C07C 69/75 | (2006.01) |
| C07C 69/753 | (2006.01) |

(52) U.S. Cl. ............. 428/1.1; 252/299.01; 252/299.63; 252/299.67; 560/84; 560/128

(58) Field of Classification Search ................ 428/1.1; 252/299.01, 299.63, 299.67; 560/84, 128
See application file for complete search history.

(56) References Cited

U.S. PATENT DOCUMENTS 5,560,864 A * 10/1996 Goulding ................ 252/299.01
7,081,281 B2 * 7/2006 Kumai et al. ................ 428/1.1

FOREIGN PATENT DOCUMENTS

| EP | 0 972 818 | 1/2000 |
| JP | 8-283718 | 10/1996 |
| JP | 10-195138 | 7/1998 |
| JP | 11-148077 | 6/1999 |

OTHER PUBLICATIONS

U.S. Appl. No. 11/616,158, filed Dec. 26, 2006, Kaida, et al.

* cited by examiner

*Primary Examiner*—Shean C Wu
(74) *Attorney, Agent, or Firm*—Oblon, Spivak, McClelland, Maier & Neustadt, P.C.

(57) ABSTRACT

To provide a novel compound which satisfies characteristics required for an optical anisotropic material and which is excellent in durability against blue laser light, a liquid crystal composition containing the compound and an optical anisotropic material employing the liquid crystal composition.

A compound represented by the following formula (1):

$$CH_2{=}CR^1{-}COO{-}(E^1)_m{-}Cy{-}Y{-}Cy{-}E^2{-}R^2 \qquad (1)$$

provided that the symbols in the formula have the following meanings. $R^1$: a hydrogen atom or a methyl group; $R^2$: a $C_{1-8}$ alkyl group; Y: —OCO— or —COO—; m: 0 or 1; $E^1$ and $E^2$: each independently a 1,4-phenylene group or a trans-1,4-cyclohexylene group; and Cy: a trans-1,4-cyclohexylene group; provided that the above 1,4-phenylene group and the trans-1,4-cyclohexylene group may be such that a hydrogen atom in each group may be substituted by a fluorine atom, a chlorine atom or a methyl group.

10 Claims, No Drawings

POLYMERIZABLE LIQUID CRYSTAL COMPOUND, LIQUID CRYSTAL COMPOSITION AND OPTICAL ANISOTROPIC MATERIAL

BACKGROUND OF THE INVENTION

1. Field of the Invention

The present invention relates to a novel compound, a liquid crystal composition containing the compound, and an optical anisotropic material obtained by polymerizing the liquid crystal composition.

2. Discussion of Background

In recent years, in order to increase the capacity of an optical disk, blue shift of laser light to be employed for writing and reading of information is in progress. At present, laser light having a wavelength of 780 nm is used for CDs, and that of 660 nm is used for DVDs, but it has been studied to use laser light having a wavelength of from 300 to 450 nm for optical recording media of the next generation. Accordingly, an optical element such as a diffraction element or a phase plate to modulate laser light having a wavelength of from 300 to 450 nm (hereinafter referred to also as blue laser light), is required, and therefore, an optical anisotropic material useful for laser light in such a wavelength range is needed.

On the other hand, liquid crystal molecules having polymerizable functional groups have both characteristics as a polymerizable monomer and characteristics as a liquid crystal. Accordingly, if the polymerization reaction is carried out after liquid crystal molecules having polymerizable functional groups are aligned, it is possible to obtain an optical anisotropic material having alignment of the liquid crystal molecules fixed. The optical anisotropic material has an optical anisotropy such as a refractive index anisotropy derived from a mesogen skeleton and is applied to e.g. a diffraction element or a phase plate by the use of such a characteristic.

As such an optical anisotropic material, for example, a polymer liquid crystal has been reported which is obtained by polymerizing a liquid crystal composition containing a compound represented by the following formula (2):

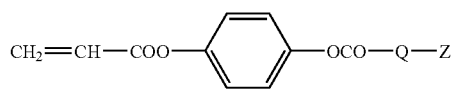

(2)

(wherein Q is a 1,4-phenylene group or a trans-1,4-cyclohexylene group, and Z is an alkyl group) (Patent Document 1).

Further, the following properties may be mentioned as properties usually required for an optical anisotropic material for a diffraction element or a phase plate.

(1) Absorption of light is low.

(2) The in-plane optical properties (such as the retardation value) are uniform.

(3) The optical properties can easily be adjusted to those of other materials constituting the element.

(4) The wavelength dispersion of the refractive index is small.

(5) The durability is good. Patent Document 1: JP-A-10-195138

However, conventional materials such as a polymer liquid crystal disclosed in JP-A-10-195138 had a problem that they are insufficient in durability against blue laser light.

SUMMARY OF THE INVENTION

The present invention has been made to solve the above problem, and it provides a novel compound satisfying the properties required for an optical anisotropic material and having high durability against blue laser light, a liquid crystal composition containing the compound, and an optical anisotropic material obtained by polymerizing the liquid crystal composition. Namely, the present invention provides the following.

1. A compound represented by the following formula (1):

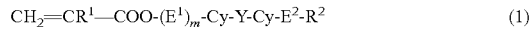

(1)

provided that the symbols in the formula have the following meanings:

$R^1$: a hydrogen atom or a methyl group;
$R^2$: a $C_{1-8}$ alkyl group;
Y: —OCO— or —COO—;
m: 0 or 1;
$E^1$ and $E^2$: each independently a 1,4-phenylene group or a trans-1,4-cyclohexylene group; and
Cy: a trans-1,4-cyclohexylene group;

provided that the above 1,4-phenylene group and trans-1,4-cyclohexylene group may be such that a hydrogen atom in each group may be substituted by a fluorine atom, a chlorine atom or a methyl group.

2. The compound according to the above 1, wherein $R^1$ is a hydrogen atom, $R^2$ is a $C_{2-6}$ alkyl group, and each of $E^1$ and $E^2$ is a 1,4-phenylene group.

3. A liquid crystal composition containing at least two compounds selected from the compounds as defined in the above 1 or at least one compound as defined in the above 1 and at least one polymerizable liquid crystal other than the compound represented by the formula (1).

4. The liquid crystal composition according to the above 3, wherein the total content of the compound as defined in the above 1 and another polymerizable liquid crystal is at lest 90 mass % based on the liquid crystal composition.

5. The liquid crystal composition according to the above 3, wherein the proportion of the compound as defined in the above 1 to the total polymerizable liquid crystal in the liquid crystal composition is at least 20 mol %.

6. An optical anisotropic material obtained by polymerizing the liquid crystal composition as defined in the above 3 in a state where the liquid crystal composition shows a liquid crystal phase and in a state where the liquid crystal is aligned.

7. The optical anisotropic material according to the above 6, which is used by transmitting laser light having a wavelength of from 300 to 450 nm therethrough.

8. An optical element obtained by sandwiching the liquid crystal composition as defined in the above 3 in a pair of supports, and polymerizing the liquid crystal composition in a state where it shows a liquid crystal phase and in a state where the liquid crystal is aligned.

9. The optical element according to the above 8, which is used by transmitting laser light having a wavelength of from 300 to 450 nm therethrough.

10. An optical head device using the optical element as defined in the above 8.

According to the present invention, a novel compound, a liquid crystal composition containing the compound, and an optical anisotropic material obtained by polymerizing the liquid crystal composition can be obtained. The optical anisotropic material is excellent in durability against blue laser light.

DETAILED DESCRIPTION OF THE PREFERRED EMBODIMENTS

In this specification, a compound represented by the formula (1) will also be referred to as a compound (1). The same applies to other compounds. A compound having both liquid crystallinity and polymerizability will be hereinafter referred to as a polymerizable liquid crystal. In a case where the cyclic group is a 1,4-cyclohexylene group, the bonds at the 1-position and 4-position are in the trans form.

The following description regarding the wavelength is meant to cover the range of the center wavelength ±2 nm. The refractive index anisotropy will be abbreviated as Δn.

The compound of the present invention is a compound represented by the following formula (1). This compound (1) has both polymerizability and liquid crystallinity and is one type of a polymerizable liquid crystal.

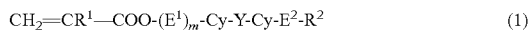
$$CH_2=CR^1-COO-(E^1)_m-Cy-Y-Cy-E^2-R^2 \quad (1)$$

$R^1$ is a hydrogen atom or a methyl group and is preferably a hydrogen atom. If $R^1$ is a hydrogen atom, the polymerization reaction readily proceeds when the after-mentioned liquid crystal composition containing the compound (1), is subjected to photopolymerization to obtain an optical anisotropic material and an optical element, such being preferred. Further, the properties as an optical anisotropic material and an optical element obtained by the photopolymerization are less susceptible to an influence of the external environment (such as the temperature), and therefore, there is also an advantage such that the in-plane distribution of the retardation is small.

$R^2$ is a $C_{1-8}$ alkyl group, whereby the melting point ($T_m$) (i.e. the crystal phase-nematic phase phase transition point) of the liquid crystal composition containing the compound (1) can be lowered. $R^2$ is preferably a $C_{2-6}$ alkyl group. Further, $R^2$ preferably has a linear structure, whereby the temperature range within which the compound (1) shows liquid crystallinity will be broad.

Y is —COO— or —OCO—, and it is preferably —OCO— with a view to lowering the melting point ($T_m$) and is preferably —COO— with a view to developing a large Δn when an optical anisotropic material or an optical is element is prepared.

m is 0 or 1, and it is preferably 0 when Y is —COO— and is preferably 1 when Y is —OCO—.

$E^1$ is a 1,4-phenylene group or a trans-1,4-cyclohexylene group. In a case where $E^1$ is a 1,4-phenylene group, Δn of the compound (1) can be made large. Accordingly, a liquid crystal composition showing a large Δn will readily be prepared. Further, in a case where $E^1$ is a trans-1,4-cyclohexylene group, absorption of blue laser light can be more suppressed.

$E^2$ is preferably a 1,4-phenylene group with a view to obtaining a large Δn, and it is preferably a trans-1,4-cyclohexylene group in view of favorable mutual solubility with another compound and with a view to further suppressing absorption of blue laser light.

The compound (1) preferably has at least one 1,4-phenylene group and accordingly, when m=0, $E^2$ is preferably a 1,4-phenylene group, and when m=1, at least one of $E^1$ and $E^2$ is preferably a 1,4-phenylene group.

In the compound (1) of the present invention, the 1,4-phenylene group (hereinafter referred to as Ph) and the trans-1,4-cyclohexylene group (hereinafter referred to as Cy) may be unsubstituted groups, or groups wherein a hydrogen atom bonded to a carbon atom is substituted by a fluorine atom, a chlorine atom or a methyl group, and they are preferably unsubstituted groups.

The compound (1) is preferably the following compound (1A) (provided that the symbols in the formula are as defined above) which is a compound of the formula (1) wherein $R^1$ is a hydrogen atom:

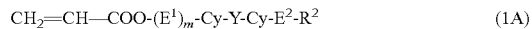
$$CH_2=CH-COO-(E^1)_m-Cy-Y-Cy-E^2-R^2 \quad (1A)$$

The following compounds may be mentioned as specific examples of the compound (1). Among them, preferred are the following compounds (1Aa2) to (1Aa6), (1Ab2) to (1Ab6), and (1Ac2) to (1Ac6), particularly preferred are the following compounds (1Aa2) to (1Aa6), and (1Ac2) to (1Ac6).

In a case where the alkyl group in the following formulae has a structural isomeric group, all such groups are included, and a linear alkyl group is preferred. In the following formulae, Ph and Cy are as defined above, and it is preferred that Ph is an unsubstituted 1,4-phenylene group and Cy is an unsubstituted trans-1,4-cyclohexylene group.

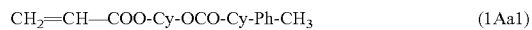
$$CH_2=CH-COO-Cy-OCO-Cy-Ph-CH_3 \quad (1Aa1)$$

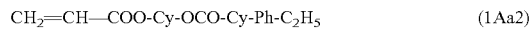
$$CH_2=CH-COO-Cy-OCO-Cy-Ph-C_2H_5 \quad (1Aa2)$$

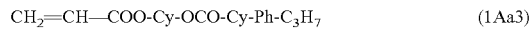
$$CH_2=CH-COO-Cy-OCO-Cy-Ph-C_3H_7 \quad (1Aa3)$$

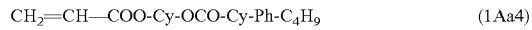
$$CH_2=CH-COO-Cy-OCO-Cy-Ph-C_4H_9 \quad (1Aa4)$$

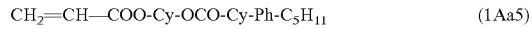
$$CH_2=CH-COO-Cy-OCO-Cy-Ph-C_5H_{11} \quad (1Aa5)$$

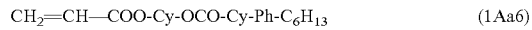
$$CH_2=CH-COO-Cy-OCO-Cy-Ph-C_6H_{13} \quad (1Aa6)$$

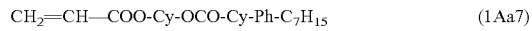
$$CH_2=CH-COO-Cy-OCO-Cy-Ph-C_7H_{15} \quad (1Aa7)$$

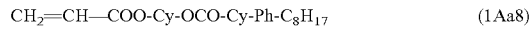
$$CH_2=CH-COO-Cy-OCO-Cy-Ph-C_8H_{17} \quad (1Aa8)$$

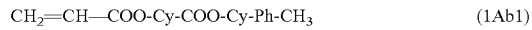
$$CH_2=CH-COO-Cy-COO-Cy-Ph-CH_3 \quad (1Ab1)$$

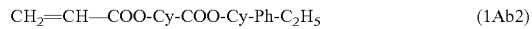
$$CH_2=CH-COO-Cy-COO-Cy-Ph-C_2H_5 \quad (1Ab2)$$

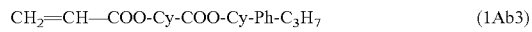
$$CH_2=CH-COO-Cy-COO-Cy-Ph-C_3H_7 \quad (1Ab3)$$

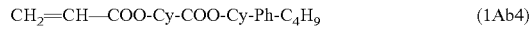
$$CH_2=CH-COO-Cy-COO-Cy-Ph-C_4H_9 \quad (1Ab4)$$

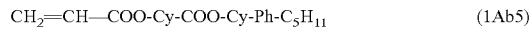
$$CH_2=CH-COO-Cy-COO-Cy-Ph-C_5H_{11} \quad (1Ab5)$$

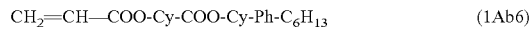
$$CH_2=CH-COO-Cy-COO-Cy-Ph-C_6H_{13} \quad (1Ab6)$$

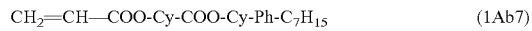
$$CH_2=CH-COO-Cy-COO-Cy-Ph-C_7H_{15} \quad (1Ab7)$$

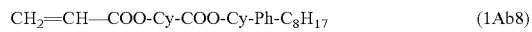
$$CH_2=CH-COO-Cy-COO-Cy-Ph-C_8H_{17} \quad (1Ab8)$$

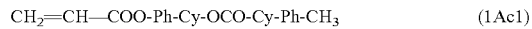
$$CH_2=CH-COO-Ph-Cy-OCO-Cy-Ph-CH_3 \quad (1Ac1)$$

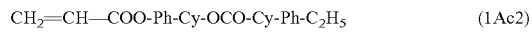
$$CH_2=CH-COO-Ph-Cy-OCO-Cy-Ph-C_2H_5 \quad (1Ac2)$$

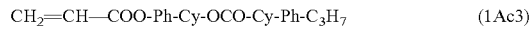
$$CH_2=CH-COO-Ph-Cy-OCO-Cy-Ph-C_3H_7 \quad (1Ac3)$$

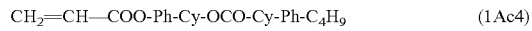
$$CH_2=CH-COO-Ph-Cy-OCO-Cy-Ph-C_4H_9 \quad (1Ac4)$$

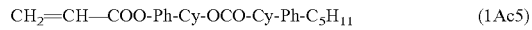
$$CH_2=CH-COO-Ph-Cy-OCO-Cy-Ph-C_5H_{11} \quad (1Ac5)$$

CH$_2$=CH—COO-Ph-Cy-OCO-Cy-Ph-C$_6$H$_{13}$ (1Ac6)

CH$_2$=CH—COO-Ph-Cy-OCO-Cy-Ph-C$_7$H$_{15}$ (1Ac7)

CH$_2$=CH—COO-Ph-Cy-OCO-Cy-Ph-C$_8$H$_{17}$ (1Ac8)

CH$_2$=CH—COO-Ph-Cy-COO-Cy-Ph-CH$_3$ (1Ad1)

CH$_2$=CH—COO-Ph-Cy-COO-Cy-Ph-C$_2$H$_5$ (1Ad2)

CH$_2$=CH—COO-Ph-Cy-COO-Cy-Ph-C$_3$H$_7$ (1Ad3)

CH$_2$=CH—COO-Ph-Cy-COO-Cy-Ph-C$_4$H$_9$ (1Ad4)

CH$_2$=CH—COO-Ph-Cy-COO-Cy-Ph-C$_5$H$_{11}$ (1Ad5)

CH$_2$=CH—COO-Ph-Cy-COO-Cy-Ph-C$_6$H$_{13}$ (1Ad6)

CH$_2$=CH—COO-Ph-Cy-COO-Cy-Ph-C$_7$H$_{15}$ (1Ad7)

CH$_2$=CH—COO-Ph-Cy-COO-Cy-Ph-C$_8$H$_{17}$ (1Ad8)

CH$_2$=C(CH$_3$)—COO-Cy-OCO-Cy-Ph-CH$_3$ (1Ba1)

CH$_2$=C(CH$_3$)—COO-Cy-OCO-Cy-Ph-C$_2$H$_5$ (1Ba2)

CH$_2$=C(CH$_3$)—COO-Cy-OCO-Cy-Ph-C$_3$H$_7$ (1Ba3)

CH$_2$=C(CH$_3$)—COO-Cy-OCO-Cy-Ph-C$_4$H$_9$ (1Ba4)

CH$_2$=C(CH$_3$)—COO-Cy-OCO-Cy-Ph-C$_5$H$_{11}$ (1Ba5)

CH$_2$=C(CH$_3$)—COO-Cy-OCO-Cy-Ph-C$_6$H$_{13}$ (1Ba6)

CH$_2$=C(CH$_3$)—COO-Cy-OCO-Cy-Ph-C$_7$H$_{15}$ (1Ba7)

CH$_2$=C(CH$_3$)—COO-Cy-OCO-Cy-Ph-C$_8$H$_{17}$ (1Ba8)

The compound (1) of the present invention may be prepared, for example, by the following processes.

As a process for preparing the compound (1) of the formula (1) wherein R$^1$ is a hydrogen atom, m is 0 and Y is —OCO—, the following process may be mentioned. Namely, the following compound (A) and acrylic acid chloride are reacted to obtain compound (B), and then the compound (B) and compound (C) are subjected to esterification reaction.

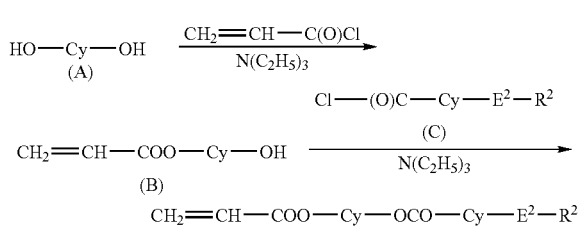

As a process for preparing the compound (1) of the formula (1) wherein R$^1$ is a hydrogen atom, m is 0 and Y is —COO—, the following process may be mentioned. Namely, the following compound (D) and acrylic acid chloride are subjected to esterification reaction to obtain the following compound (E), and then the following compound (E) and the following compound (F) are subjected to condensation reaction. Here, DCC represents dicyclohexylcarbodiimide.

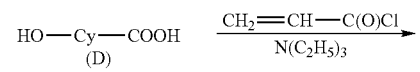
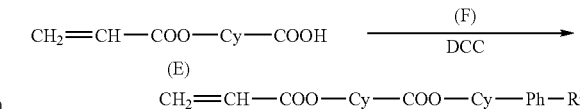

As a process for preparing the compound of the formula (1) wherein R$^1$ is a hydrogen atom, E$^1$ is Ph, Y is —OCO— and E$^2$ is Cy, the following process may be mentioned. Namely, the following compound (G) and acrylic acid chloride are subjected to esterification reaction to obtain the following compound (H), and the compound (H) and the following compound (I) are subjected to condensation reaction by using DCC.

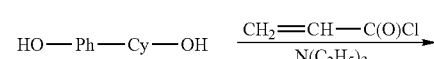
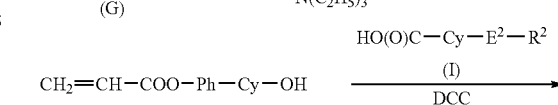

Here, compounds wherein R$^1$ is a methyl group, may also be prepared in the same manner as the above processes by changing acrylic acid chloride to methacrylic acid chloride.

The compound (1) of the present invention has a partial structure of "-Cy-Y-Cy-E$^2$-". By this structure, the compound (1) has durability against blue laser light, a favorable Δn value, a low melting point (T$_m$) and high mutual solubility with another polymerizable liquid crystal in a well balanced manner.

That is, the compound (1) of the preset invention has three or four cyclic groups, whereby it has favorable durability against blue laser light. Three among these cyclic groups are continuously disposed, and one of the bonds between these cyclic groups is a single bond and the other is —COO— or —OCO—, and thus the compound (1) is excellent in the balance between durability and properties such as Δn, mutual solubility, etc.

Further, in a case where the electron-donative -Cy- is directly bonded to the electron-attractive acryloyl group or methacrylol group, it is considered that stabilization of the ester bond also contributes to improvement in durability. Further, such a compound (1) has no -Ph-CO— structure and has -Cy- as a cyclic saturated hydrocarbon group which absorbs no light even in a short wavelength region of at most 400 nm, whereby absorption of blue laser light is small. Further, in a case where the compound (1) has at least one 1,4-phenylene group, Δn can be made large. Accordingly, by the use of the compound (1), an optical anisotropic material and an optical element which have sufficient durability against blue laser light and also have excellent characteristics such as the phase difference can be provided.

The compound (1) of the present invention is used preferably as one component of a liquid crystal composition to obtain a polymer liquid crystal. In such a case, the compound (1) of the present invention shows a sufficiently broad liquid crystal temperature range by itself and has such a characteristic that the temperature range in which the compound shows a liquid crystal phase is broad particularly to a high temperature side. However, in order that the liquid crystal composition to obtain a polymer liquid crystal shows liquid crystallinity also in a low temperature side, the liquid crystal composition is preferably a liquid crystal composition containing at least two compounds selected from the compounds (1) or a liquid crystal composition containing the compound (1) and a polymerizable liquid crystal other than the compound (1). By the use of such a liquid crystal composition, the temperature range in which the liquid crystal composition shows a liquid crystal phase can be further broader. Further, due to a drop in the melting point ($T_m$) the handling efficiency will improve.

In a case where the liquid crystal composition contains at least two compounds selected from the compounds (1), it preferably contains at least two compounds having the same structure other than the $R^2$ moiety but differing in the number of carbon atoms in the $R^2$ moiety, in view of favorable mutual solubility. Specifically, it preferably contains at least one member selected from compounds wherein $R^2$ is $C_{2-4}$ linear alkyl group and at least one member selected from compounds wherein $R^2$ is a $C_{5-8}$ linear alkyl group, and it particularly preferably contains a compound wherein $R^2$ is a n-propyl group and a compound wherein $R^2$ is a n-pentyl group.

In a case where the liquid crystal composition contains the compound (1) and a polymerizable liquid crystal other than the compound (1), the polymerizable liquid crystal other than the compound (1) is preferably a compound having an acryloyl group or a methacryloyl group, particularly preferably a compound having an acryloyl group. Further, the polymerizable liquid crystal preferably contains no -Ph-CO— structure in its mesogen structure, whereby high durability against blue laser light will be achieved.

As the polymerizable liquid crystal other than the compound (1), a compound represented by the following formula (3A), a compound represented by the following formula (3B) or a compound represented by the following formula (3C) is preferred. Hereinafter sometimes they will generically be referred to as a compound (3).

$$CH_2=CR^3\text{—}COO\text{-Ph-OCO-Cy-}Z^2\text{-}R^4 \quad (3A)$$

$$CH_2=CR^5\text{—}COO\text{-}Z^3Z^4\text{-}Z^6 \quad (3B)$$

$$CH_2=CR^7\text{—}COO\text{—}(CH_2)_v\text{—}O\text{-Ph-}Z^5\text{-}R^8 \quad (3C)$$

In the formulae, Ph and Cy are as defined above, and the other symbols have the following meanings:

$R^3$, $R^5$, $R^7$: each independently a hydrogen atom or a methyl group;

$R^4$, $R^6$, $R^8$: each independently a $C_{1-8}$ alkyl group;

$Z^2$, $Z^3$, $Z^4$, $Z^5$: each independently a 1,4-phenylene group or a trans-1,4-cyclohexylene group; and n: an integer of from 1 to 8.

As specific examples of the compounds (3A) to (3C), the following compounds (3Aa), (3Ab), (3Bc), (3Bd), (3Be), (3Cf) and (3Cg) may be mentioned (provided that in the formulae, Ph and Cy are as defined above, each of v1 and v2 which are independent of each other, is an integer of from 1 to 8, and each of a to g which are independent of one another, is an integer of from 1 to 8). One or more of these compounds may be used.

$$CH_2=CH\text{—}COO\text{-Ph-OCO-Cy-Ph-}(CH_2)_a H \quad (3Aa)$$

$$CH_2=CH\text{—}COO\text{-Ph-OCO-Cy-Cy-}(CH_2)_b H \quad (3Ab)$$

$$CH_2=CH\text{—}COO\text{-Cy-Cy-}(CH_2)_c H \quad (3Bc)$$

$$CH_2=CH\text{—}COO\text{-Ph-Cy-}(CH_2)_d H \quad (3Bd)$$

$$CH_2=CH\text{—}COO\text{-Ph-Ph-}(CH_2)_e H \quad (3Be)$$

$$CH_2=CH\text{—}COO\text{—}(CH_2)_{v1}\text{—}O\text{-Ph-Cy-}(CH_2)_f H \quad (3Cf)$$

$$CH_2=CH\text{—}COO\text{—}(CH_2)_{v2}\text{—}O\text{-Ph-Ph-}(CH_2)_g H \quad (3Cg)$$

A preferred combination for preparation of a liquid crystal composition is properly selected in accordance with the type of the compound (1). For example, a liquid crystal composition containing the following compound (1Aa) and the following compound (3Aa), or a liquid crystal composition containing the following compound (1Ac) and the following compound (3Bc) is preferred.

$$CH_2=CH\text{—}COO\text{-Cy-OCO-Cy-Ph-}R^2 \quad (1Aa)$$

$$CH_2=CH\text{—}COO\text{-Ph-OCO-Cy-Ph-}(CH_2)_a H \quad (3Aa)$$

$$CH_2=CH\text{—}COO\text{-Ph-Cy-OCO-Cy-Ph-}R^2 \quad (1Ac)$$

$$CH_2=CH\text{—}COO\text{-Cy-Cy-}(CH_2)_c H \quad (3Bc)$$

The liquid crystal composition for production of a polymer liquid crystal is a liquid crystal composition containing at least 75 mass % of a polymerizable liquid crystal, preferably a liquid crystal composition containing at least 90 mass %. The liquid crystal composition may contain a non-liquid crystalline polymerizable compound or a non-polymerizable liquid crystal compound. The liquid crystal composition is preferably a liquid crystal composition containing substantially no non-liquid crystalline polymerizable compound nor non-polymerizable liquid crystal compound and containing at least 90 mass %, particularly preferably at least 95 mass % of a polymerizable liquid crystal. In the present invention, the liquid crystal composition for production of a polymer liquid crystal is preferably a liquid crystal composition containing at least 5 mass % of the compound (1) based on the entire polymerizable liquid crystal in the liquid crystal composition.

In the present invention, the liquid crystal composition suitable for production of a polymer liquid crystal is, as mentioned above, a liquid crystal composition containing at least two types of the compounds (1) or a liquid crystal composition containing at least one type of the compound (1) and at least one type of the compound (3). In such a liquid crystal composition, the total amount of the compound (1) and the compound (3) is preferably from 50 to 100 mass % based on the entire polymerizable liquid crystal in the liquid crystal composition, particularly preferably from 80 to 100 mass %. Further, especially preferred is a liquid crystal composition containing substantially only the compound (1) or containing only the compound (1) and the compound (3) as the polymerizable liquid crystal in the liquid crystal composition. In a case where the compound (1) and the compound (3) are used in combination, the proportion of the compound (1) to the total amount of them is preferably at least 20 mol %. Particularly in a case where the compound (3) is used in combination for the purpose of broadening the temperature range in which the liquid crystal composition shows a liquid crystal phase, or for another purpose, in order to achieve higher effects, the proportion of the compound (1) to the total amount of them is preferably from 20 to 70 mol %.

Further, the liquid crystal composition of the present invention may contain a component (hereinafter referred to as another component) other than the polymerizable liquid crystal such as the compound (1) and the compound (3). Such another component may, for example, be a polymerization initiator, a chiral agent, an ultraviolet absorber, an antioxidant, a photostabilizer or a dichroic dye.

The total amount of the polymerizable liquid crystal such as the compound (1) and the compound (3) (hereinafter referred to as the "total amount of the liquid crystal") contained in the liquid crystal composition, and the proportion of another component, are preferably adjusted depending upon the purpose of use. For example, in a case where a chiral agent is used as another component, the total amount of the liquid crystal is preferably from 20 to 95 mass %, particularly preferably from 50 to 95 mass % based on the liquid crystal composition. The amount of the chiral agent is preferably from 5 to 80 mass %, particularly preferably from 5 to 50 mass % based on the liquid crystal composition.

In a case where a dichroic dye is used as another component, the total amount of the liquid crystal is preferably from 80 to 99 mass %, particularly preferably from 82 to 97 mass % based on the liquid crystal composition. The amount of the dichroic dye is preferably from 1 to 20 mass %, particularly preferably from 3 to 18 mass % based on the liquid crystal composition.

In a case where an ultraviolet absorber, an antioxidant, a photostabilizer or the like is used as another component, the amount of the such a component is preferably at most 5 mass %, particularly preferably at most 2 mass % based on the liquid crystal composition. The total amount of the liquid crystal in such a case is preferably from 95 to 100 mass %, particularly preferably from 98 to 100 mass % based on the liquid crystal composition. The proportion of the polymerization initiator will be described hereinafter.

Now, the optical anisotropic material of the present invention will be described below. The optical anisotropic material of the present invention is obtained by subjecting the above liquid crystal composition to polymerization reaction in a state where the liquid crystal composition shows a liquid crystal phase and in a state where the liquid crystal is aligned.

In order to keep the state where the liquid crystal composition shows a liquid crystal phase, the temperature of the atmosphere may be kept to be at most the nematic phase-isotropic phase transition temperature ($T_c$), but $\Delta n$ of the liquid crystal composition is extremely small at a temperature in the vicinity of $T_c$. Therefore, the upper limit of the temperature of the atmosphere is preferably at most ($T_c$-10)° C.

The polymerization reaction may, for example, be photopolymerization reaction or heat polymerization reaction, and photopolymerization reaction is preferred. The light to be used for the photopolymerization reaction is preferably ultraviolet light or visible light. In the case of photopolymerization reaction, a photopolymerization initiator is preferably used, which is properly selected from acetophenones, benzophenones, benzoins, benzyls, Michler's ketones, benzoin alkyl ethers, benzyl dimethyl ketals and thioxanthones. Such photopolymerization initiators may be used alone or in combination of two or more of them. The amount of the photopolymerization initiator is preferably from 0.1 to 5 mass %, particularly preferably from 0.3 to 2 mass % based on the entire amount of the liquid crystal composition.

Now, the optical element of the present invention will be described below. The optical element of the present invention is obtained by sandwiching the above liquid crystal composition between a pair of supports having alignment treatment applied thereto and subjecting the liquid crystal composition to polymerization reaction in a state where the liquid crystal composition shows a liquid crystal phase and in a state where the liquid crystal is aligned.

The supports are preferably supports having alignment treatment applied to a transparent substrate made of glass or a resin. The alignment treatment is carried out preferably by e.g. a method of directly rubbing the surface of the transparent substrate with e.g. fibers such as cotton, wool, nylon or polyester, a method of laminating a polyimide alignment film on the surface of the transparent substrate and then rubbing the surface of the alignment film with the above fibers, or a method of oblique evaporation of an inorganic material on the surface of the transparent substrate.

Then, spacers such as glass beads are placed on the surface to which alignment treatment has been applied, and a plurality of such supports are disposed to face each other with a desired space, and the liquid crystal composition is sandwiched between the supports, followed by the polymerization reaction. The polymerization reaction may be carried out in the same manner as in the polymerization reaction to prepare the optical anisotropic material. The optical element prepared by the polymerization reaction may be used as it is sandwiched between the supports, or it may be peeled from the supports and used.

The optical anisotropic material and the optical element of the present invention have high durability against blue laser light and thus are useful for an optical anisotropic material and an optical element through which such laser light is transmitted. Particularly, they are useful as an optical anisotropic material to be used to modulate the phase state and/or wavefront state of the laser light and an optical element having a member comprising the optical anisotropic material. For example, the optical element may be used as mounted on an optical head device as a diffraction element such as a polarizing hologram, a phase plate, or the like. As a polarizing hologram, there may, for example, be a case where signal lights due to the reflection of lights emitted from a laser light source on an information recorded surface of an optical disk, are separated and then introduced into a photo-receiving element. As a phase plate, there may be a case where it is used as a half wavelength plate, to control the phase difference of the light emitted from a laser light source, or a case where it is installed as a quarter wavelength plate in an optical path to stabilize the output of the laser light source.

EXAMPLES

Now, the present invention will be described in detail with reference to Examples. However, the present invention is by no means restricted to such specific Examples.

Examples 1 to 9 are Examples of the present invention, and Example 10 is a Comparative Example. In the following Examples, Irgacure 907 manufactured by Ciba Specialty Chemicals K.K. was used as a photopolymerization initiator.

Example 1

Preparation Example for Compound (1Aa3)

Example 1-1

Preparation Example for Compound (B-1)

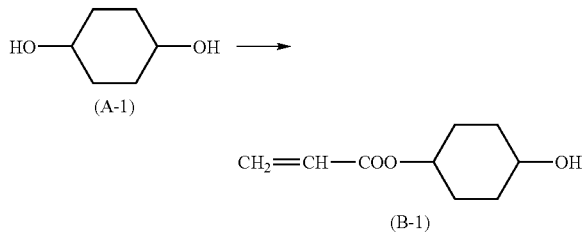

In a three-necked flask equipped with a dropping apparatus and a stirrer, compound (A-1) (6.9 g), triethylamine (1.8 g) and tetrahydrofuran (THF) (200 mL) were added. Acrylic acid chloride (1.5 g) was dropwise added thereto under cooling with ice so that the temperature of the reaction solution would not exceed 20° C. After stirring for 24 hours, concentrated hydrochloric acid (2 mL), water (100 mL) and diethyl ether (100 mL) were added to the reaction solution, followed by liquid separation, and the resulting organic layer was recovered. The recovered organic layer was washed with water and then dried over anhydrous magnesium sulfate. Anhydrous magnesium sulfate was removed by filtration, and the filtrate was concentrated to obtain a pale yellow liquid. The obtained liquid was purified by silica gel column chromatography (developing solution: hexane/ethyl acetate=6/4, volume ratio) to obtain compound (B-1) (1.8 g) The yield was 64%.

Example 1-2

Preparation Example for Compound (1Aa3)

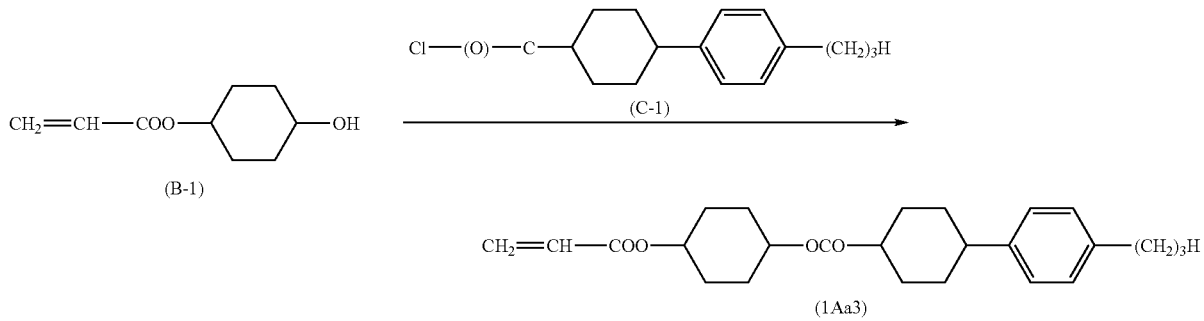

The compound (B-1) (1.8 g) obtained in Example 1-1 and triethylamine (1.4 g) were dissolved in THF (70 mL). A solution having compound (C-1) (3.4 g) dissolved in THF (20 mL) was dropwise added thereto under cooling with ice so that the reaction temperature would not exceed 20° C. After stirring for 24 hours, concentrated hydrochloric acid (2 mL), water (50 mL) and diethyl ether (100 mL) were added to the reaction solution, followed by liquid separation, and the resulting organic layer was recovered. The recovered organic layer was washed with water and dried over anhydrous magnesium sulfate. Anhydrous magnesium sulfate was removed by filtration, and the solvent was distilled off to obtain white powdery crystals. The powdery crystals were recrystallized from hexane-dichloromethane (8/2, volume ratio) (90 mL) to obtain compound (1Aa3) (1.6 g). The yield was 45%.

The compound (1Aa3) had a phase transition temperature from a crystal phase to a nematic phase of 78.5° C. and a phase transition temperature from a nematic phase to an isotropic phase of 103.4° C. Further, Δn to laser light having a wavelength of 589 nm at 60° C. was 0.082.

$^1$HNMR spectrum data of the compound (1Aa3) are shown below.

$^1$HNMR (400 MHz, solvent: CDCl$_3$, internal standard: TMS) δ (ppm): 0.96 (t, 3H), 1.6-1.8 (m, 18H), 2.27 (m, 1H), 2.6-2.7 (m, 3H), 4.9-5.1 (m, 2H), 5.8-6.7 (m, 3H), 7.0-7.2 (dd, 4H).

Example 2

Preparation Example for Compound (1Ac3)

Example 2-1

Preparation Example for Compound (H-1)

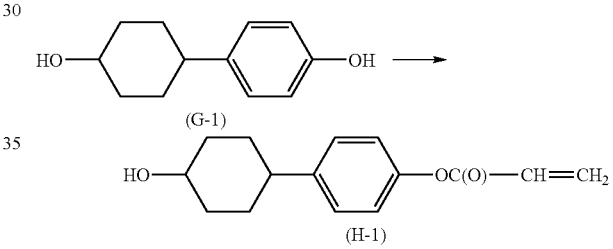

Into a 1 L four-necked flask equipped with a dropping apparatus, a reflux apparatus and a stirrer, compound (G-1) (20 g, 0.1 mol), sodium hydroxide (4.0 g, 0.1 mol), tetrahydrofuran (100 mL) and water (50 mL) were added, followed by stirring at room temperature for one hour, and acrylic acid chloride (9.01 g, 0.1 mol) was dropwise added thereto. Stirring was carried out at room temperature further for one hour, and after completion of the reaction, diethyl ether (50 mL) and water (100 mL) were added, and the resulting organic layer was recovered. The organic layer was washed with 1 M hydrochloric acid (100 mL) and then washed with a saturated salt solution (100 mL), and the organic layer was recovered again. The organic layer was dried over anhydrous magnesium sulfate, and anhydrous magnesium sulfate was removed by vacuum filtration. The solvent was distilled off under reduced pressure, and ethanol (100 mL) was added to the obtained residue for recrystallization to obtain compound (H-1) (20.2 g). The yield was 82%.

Example 2-2

Preparation Example for Compound (1Ac3)

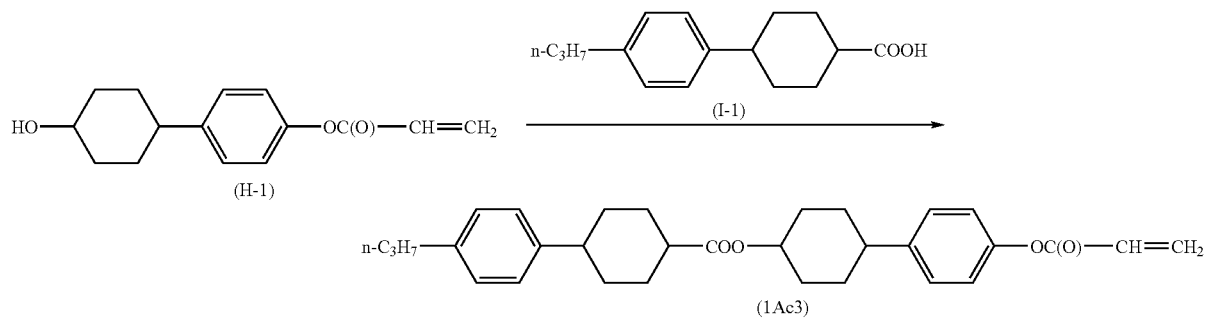

Into a 1 L four-necked flask equipped with a reflux apparatus and a stirrer, the compound (H-1) (12.1 g 0.047 mol) obtained in Example 2-1, compound (I-1) (11.6 g, 0.049 mol), dicyclohexylcarbodiimide (16.7 g, 0.081 mol), N,N-dimethylaminopyridine (1.80 g, 0.015 mol) and dehydrated dichloromethane (200 mL) were added, followed by stirring at room temperature for 24 hours. After completion of the reaction, matters insoluble in dichloromethane were removed by vacuum filtration, water (200 mL) was added, followed by liquid separation, and the resulting organic layer was recovered. The recovered organic layer was dried over anhydrous magnesium sulfate. Anhydrous magnesium sulfate was removed by vacuum filtration, and dichloromethane was distilled off under reduced pressure. The obtained residue was purified by column chromatography (developing solution:hexane/ethyl acetate=6/4, volume ratio) to obtain a fraction containing the aimed product. The fraction was concentrated to obtain powdery crystals. To the powdery crystals, hexane (200 mL) was added for recrystallization to obtain compound (1Ac3) (14.4 g). The yield was 65%.

The compound (1Ac3) had a phase transition temperature from a crystal phase to a nematic phase of 68.8° C. and a phase transition temperature from a nematic phase to an isotropic phase of 317° C. (extrapolation value). Further, Δn of the compound (1Ac3) to laser light having a wavelength of 589 nm at 60° C. was 0.1328.

HNMR spectrum data of the compound (1Ac3)

$^1$HNMR (400 MHz, solvent: CDCl$_3$, internal standard: TMS) δ (ppm): 0.96 (t, 3H), 1.6-1.8 (m, 18H), 2.27 (m, 1H), 2.55 (t, 2H), 2.72 (m, 2H), 3.91 (m, 1H), 5.9-6.4 (m, 3H), 7.0-7.2 (dd, 8H).

Example 3

Preparation Example for Compound (1Ac5)

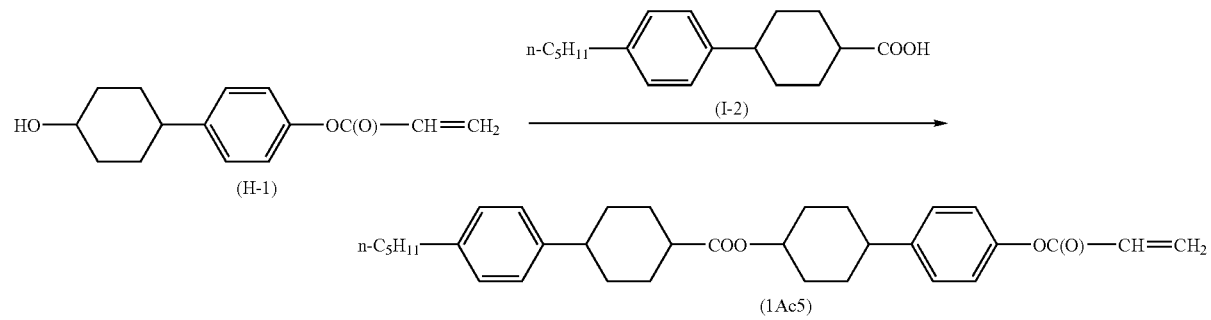

Compound (1Ac5) (16.0 g) was obtained in the same manner as in Example 2-2 except that compound (I-2) (12.7 g, 0.049 mol) was used instead of the compound (I-1) (11.6 g, 0.049 mol). The yield was 67%.

The compound (1Ac5) had a phase transition temperature from a crystal phase to a nematic phase of 69.2° C. and a phase transition temperature from a nematic phase to an isotropic phase of 336° C. (extrapolation value). Further, Δn of the compound (1Ac5) to laser light having a wavelength of 589 nm at 60° C. was 0.1321.

$^1$HNMR spectrum data of the compound (1Ac5)

$^1$HNMR (400 MHz, solvent: CDCl3, internal standard: TMS) δ (ppm): 0.96 (t, 3H), 1.3-1.4 (m, 4H), 1.6-1.8 (m, 18H), 2.27 (m, 1H), 2.55 (t, 2H), 2.72 (m, 2H), 3.91 (m, 1H), 5.9-6.4 (m, 3H), 7.0-7.2 (dd, 8H).

Example 4

Preparation Example (1) for Liquid Crystal Composition

The compound (1Aa3) prepared in Example 1 and the following compound (3Aa5) were mixed in a ratio of 3:7 (molar ratio) to prepare a liquid crystal composition A. The liquid crystal composition A showed a nematic phase in a supercooled state at room temperature. Further, the phase transition temperature from a nematic phase to an isotropic phase was 98.0° C. Then, a photopolymerization initiator was added to the liquid crystal composition A in an amount of 0.5 mass % based on the liquid crystal composition A to obtain a liquid crystal composition A1.

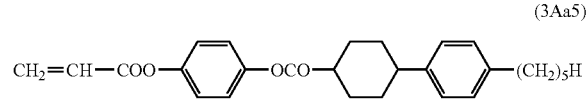

(3Aa5)

Example 5

Preparation Example (2) for Liquid Crystal Composition

The compound (1Ac3) obtained in Example 2 and the compound (1Ac5) obtained in Example 3 were mixed in a ratio of 1:1 (molar ratio) to obtain a liquid crystal composition B. The liquid crystal composition B showed a nematic phase at 66.4° C. Further, the phase transition temperature from a nematic phase to an isotropic phase was at least 124° C. Then, a photopolymerization initiator was added to the liquid crystal composition B in an amount of 0.5 mass % based on the liquid crystal composition B to obtain a liquid crystal composition B1.

Example 6

Preparation Example (3) for Liquid Crystal Composition

The compound (1Ac3) obtained in Example 2, the following compound (3Bc3) and the following compound (3Bc5) were mixed in a ratio of 2:1:1 (molar ratio) to obtain a liquid crystal composition C. The liquid crystal composition C showed a nematic phase at 50.4° C. Further, the phase transition temperature from a nematic phase to an isotropic phase was at least 124° C. Then, a photopolymerization initiator was added to the liquid crystal composition C in an amount of 0.5 mass % based on the liquid crystal composition C to obtain a liquid crystal composition C1.

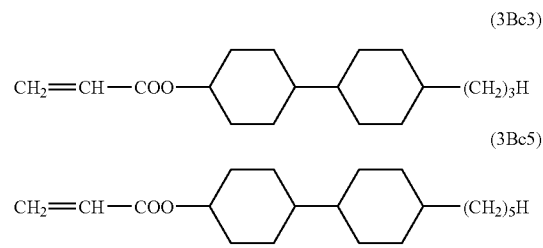

Example 7

Example (1) for Preparation of Optical Element

Example 7-1

Example for Preparation of Optical Element A

A glass substrate of 5 cm×5 cm×0.5 mm in thickness was coated with a polyimide solution by spin-coating and dried, and then subjected to rubbing treatment in a constant direction with a nylon cloth to prepare a support. Two such supports were bonded to each other by use of an adhesive agent so that the surfaces which were treated for alignment faced each other, whereby a cell was prepared. Glass beads having a diameter of 4 μm were added to the adhesive agent so that the space between the supports was adjusted to 4 μm.

Then, the liquid crystal composition A1 obtained in Example 4 was injected into the cell at 100° C. Photopolymerization was conducted under irradiation with ultraviolet light with an intensity of 80 mW/cm$^2$ at 80° C. so that the total amount of light was 5,300 mJ/cm$^2$ to obtain an optical element A. The optical element A was horizontally aligned in the rubbing direction. Δn of the optical element A to laser light having a wavelength of 589 nm was 0.055. Further, the optical element A was transparent in the visible range, and no scattering was observed.

Example 7-2

Example for Evaluation of Optical Element A

Further, the optical element A obtained in Example 7-1 was irradiated with a Kr laser (multimode at wavelengths of 407 nm and 413 nm) to carry out an accelerated exposure test with blue laser light. The irradiation conditions were such that the temperature was 25° C. and the total exposure energy was 15 W×hour/mm$^2$. The decrease in Δn after the test relative to Δn before the accelerated exposure test was less than 1%, and the decrease in the transmittance to laser light having a wavelength of 405 nm was less than 1%, whereby the optical element A was confirmed to be excellent in durability against blue laser light.

Example 8

Example for Preparation and Evaluation of Optical Element B

An optical element B was obtained in the same manner as in Example 7-1 except that the liquid crystal composition B1 obtained in Example 5 was used instead of the liquid crystal composition A1. The optical element B was horizontally aligned in the rubbing direction. Δn to laser light having a wavelength of 589 nm was 0.053. Further, the optical element B was transparent in the visible range, and no scattering was observed.

The optical element B was subjected to an accelerated exposure test with blue laser light in the same manner as in Example 7-2. The decrease in Δn after the test relative to Δn before the accelerated exposure test was less than 1%, and the decrease in the transmittance to laser light having a wavelength of 405 nm was less than 1%, whereby the optical element B was confirmed to be excellent in durability against blue laser light.

Example 9

Example for Preparation and Evaluation of Optical Element C

An optical element C was obtained in the same manner as in Example 7-1 except that the liquid crystal composition C1 obtained in Example 6 was used instead of the liquid crystal composition A1. The optical element C was horizontally aligned in the rubbing direction. Δn to laser light having a wavelength of 589 nm was 0.012. Further, the optical element C was transparent in the visible range, and no scattering was observed.

The optical element C was subjected to an accelerated exposure test with blue laser light in the same manner as in Example 7-2. The decrease in Δn after the test relative to Δn before the accelerated exposure test was less than 1%, and the decrease in the transmittance to laser light having a wavelength of 405 nm was less than 1%, whereby the optical element C was confirmed to be excellent in durability against blue laser light.

Example 10

Example 10-1

Example (4) for Preparation of Liquid Crystal Composition

The following compound (4a), the following compound (4b), the following compound (4c) and the following compound (4d) were mixed in a ratio of 1:1:1:1 (mass ratio) to prepare a liquid crystal composition D. Then, a photopolymerization initiator was added to the liquid crystal composition D in an amount of 0.5 mass % based on the liquid crystal composition D to obtain a liquid crystal composition D1.

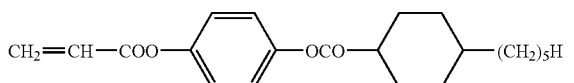
(4a)

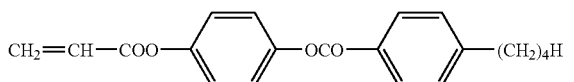
(4b)

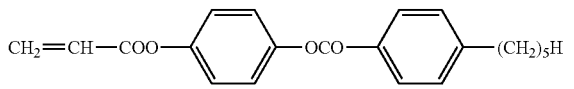
(4c)

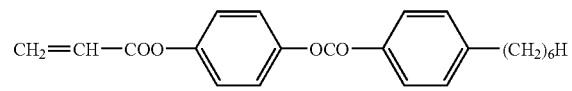
(4d)

Example 10-2

Example for Preparation and Evaluation of Optical Element D

An optical element D was obtained in the same manner as in Example 7-1 except that the liquid crystal composition D1 obtained in Example 10-1 was used instead of the liquid crystal composition A1. Δn to laser light having a wavelength of 589 nm was 0.046. Further, the optical element D was transparent in the visible range, and no scattering was observed.

An accelerated exposure test with blue laser light was carried out in the same manner as in Example 7-2 on the optical element D. The decrease in Δn after the test relative to Δn before the accelerated exposure test was 30%. Further, the transmittance to laser light having a wavelength of 405 nm after the test decreased to 60% of the transmittance before the test.

The compound of the present invention is a compound which satisfies characteristics required for an optical anisotropic material and which is excellent in durability against blue laser light. An optical anisotropic material obtained by polymerizing a liquid crystal composition containing the compound of the present invention is excellent in durability against blue laser light, whereby it is useful as a material for a diffraction element, a phase plate, etc. which modulate blue laser light.

The entire disclosure of Japanese Patent Application No. 2004-187788 filed on Jun. 25, 2004 including specification, claims and summary is incorporated herein by reference in its entirety.

What is claimed is:

1. A compound represented by the following formula (1):

$$CH_2=CR^1-COO-(E^1)_m-Cy-Y-Cy-E^2-R^2 \quad (1)$$

provided that the symbols in the formula have the following meanings:

$R^1$: a hydrogen atom or a methyl group;
$R^2$: a $C_{1-8}$ alkyl group;
Y: —OCO— or —COO—;
m: 0 or 1;
$E^1$ and $E^2$: each independently a 1,4-phenylene group or a trans-1,4-cyclohexylene group; and
Cy: a trans-1,4-cyclohexylene group;

provided that the above 1,4-phenylene group and trans-1,4-cyclohexylene group may be such that a hydrogen atom in each group may be substituted by a fluorine atom, a chlorine atom or a methyl group.

2. The compound according to claim 1, wherein $R^1$ is a hydrogen atom, $R^2$ is a $C_{2-6}$ alkyl group, and each of $E^1$ and $E^2$ is a 1,4-phenylene group.

3. A liquid crystal composition containing at least two compound embodiments of formula (1) as defined in claim 1 or at least one compound embodiment of formula (1) and at least one polymerizable liquid crystal other than the compound represented by the formula (1).

4. The liquid crystal composition according to claim 3, wherein the total content of the compound embodiment of formula (1) and another polymerizable liquid crystal is at lest 90 mass % based on the liquid crystal composition.

5. The liquid crystal composition according to claim 3, wherein the proportion of the compound of formula (1) to the total polymerizable liquid crystal in the liquid crystal composition is at least 20 mol %.

6. An optical anisotropic material obtained by polymerizing the liquid crystal composition as defined in claim 3 in a state where the liquid crystal composition shows a liquid crystal phase and in a state where the liquid crystal is aligned.

7. The optical anisotropic material according to claim 6, which is used by transmitting laser light having a wavelength of from 300 to 450 nm therethrough.

8. An optical element obtained by sandwiching the liquid crystal composition as defined in claim 3 in a pair of supports, and polymerizing the liquid crystal composition in a state where it shows a liquid crystal phase and in a state where the liquid crystal is aligned.

9. The optical element according to claim 8, which is used by transmitting laser light having a wavelength of from 300 to 450 nm therethrough.

10. An optical head device using the optical element as defined in claim 8.

* * * * *